United States Patent
Todeschini et al.

(10) Patent No.: US 9,800,412 B2
(45) Date of Patent: *Oct. 24, 2017

(54) SYSTEM AND METHOD FOR SECURING SENSITIVE DATA

(71) Applicant: Hand Held Products, Inc., Fort Mill, SC (US)

(72) Inventors: Erik Todeschini, Camillus, NY (US); Stephen Patrick Deloge, Palmyra, NY (US); Donald Anderson, Locke, NY (US)

(73) Assignee: Hand Held Products, Inc., Fort Mill, SC (US)

( * ) Notice: Subject to any disclaimer, the term of this patent is extended or adjusted under 35 U.S.C. 154(b) by 12 days.

This patent is subject to a terminal disclaimer.

(21) Appl. No.: 14/948,822

(22) Filed: Nov. 23, 2015

(65) Prior Publication Data

US 2016/0080150 A1    Mar. 17, 2016

Related U.S. Application Data

(63) Continuation of application No. 13/897,907, filed on May 20, 2013, now Pat. No. 9,195,844.

(51) Int. Cl.
G06F 17/30 (2006.01)
H04L 9/32 (2006.01)
G06F 21/62 (2013.01)
G06F 21/60 (2013.01)

(52) U.S. Cl.
CPC .............. *H04L 9/32* (2013.01); *G06F 21/602* (2013.01); *G06F 21/6209* (2013.01); *G06F 2221/2107* (2013.01)

(58) Field of Classification Search
CPC ... G06F 21/60; G06F 21/10; G11B 20/00086; G11B 20/0021; H04L 63/0428; H04N 21/4405
USPC .......................................................... 726/26
See application file for complete search history.

(56) References Cited

U.S. PATENT DOCUMENTS 9,195,844 B2    11/2015  Todeschini et al.
2008/0034413 A1*  2/2008  He et al. ............................ 726/9
2012/0166576 A1*  6/2012  Orsini et al. .................. 709/217

* cited by examiner

*Primary Examiner* — Baotran N To
(74) *Attorney, Agent, or Firm* — Additon, Higgins & Pendleton, P.A.

(57) ABSTRACT

An approach is provided for securing data in a technical environment. In one embodiment, a processor obtains a first file, which when executed installs a first portion of a second file and an assembly key to assemble the second file. The processor executes this first file and then obtains the second portion of the second file. The processor assembles the second file using the first portion, the second portion, and the assembly key.

20 Claims, 7 Drawing Sheets

SYSTEM AND METHOD FOR SECURING SENSITIVE DATA

CROSS REFERENCE TO RELATED APPLICATIONS

The present application is a continuation of and claims the benefit of priority to U.S. patent application Ser. No. 13/897,907 for a System and Method for Securing Sensitive Data filed May 20, 2013, now U.S. Pat. No. 9,195,844. The foregoing patent application and patent are hereby incorporated by reference.

TECHNICAL FIELD

One or more aspects of the present invention relate to securing original sensitive data by partitioning the data into portions that cannot be readily reassembled into the original sensitive data without an assembly key, while preserving the integrity of the data.

BACKGROUND

Installing sensitive and proprietary information on consumer devices exposes the information to reuse, reverse engineering and other security threats and attacks. Hosting this sensitive information on a remote computer, including but not limited to a resource in a cloud, requires higher server and transmission security and also compromises the functionality of the mobile device due to the time required to access and obtain the information remotely.

BRIEF SUMMARY

In one embodiment, a method is provided for securing sensitive data in a technical environment. The method includes obtaining, by a processor, a first file. When executed by a processor, this first file installs, on a memory, a first portion of a second file, and an assembly key to assemble the second file. When assembled, this second file includes this first portion and a second portion of the second file. The method further includes the processor executing the first file, obtaining the second portion of the second file, and assembling the second file from the first portion of the second file and the second portion of the second file with the assembly key.

In another embodiment, a computer program product is provided for securing sensitive data in a technical environment. The computer program product includes a computer readable storage medium and program code stored on the computer readable storage medium. The program code is executable by a processing circuit to perform a method including obtaining a first file. When executed by a processor, this first file installs, on a memory, a first portion of a second file, and an assembly key to assemble the second file. When assembled, this second file includes this first portion and a second portion of the second file. The method further includes the processor executing the first file, obtaining the second portion of the second file, and assembling the second file from the first portion of the second file and the second portion of the second file with the assembly key.

Computer systems and methods relating to one or more aspects of the present invention are also described and may be claimed herein. Further, services relating to one or more aspects of the present invention are also described and may be claimed herein.

Additional features and are realized through other embodiments of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawings in which

DETAILED DESCRIPTION

Figure 1:
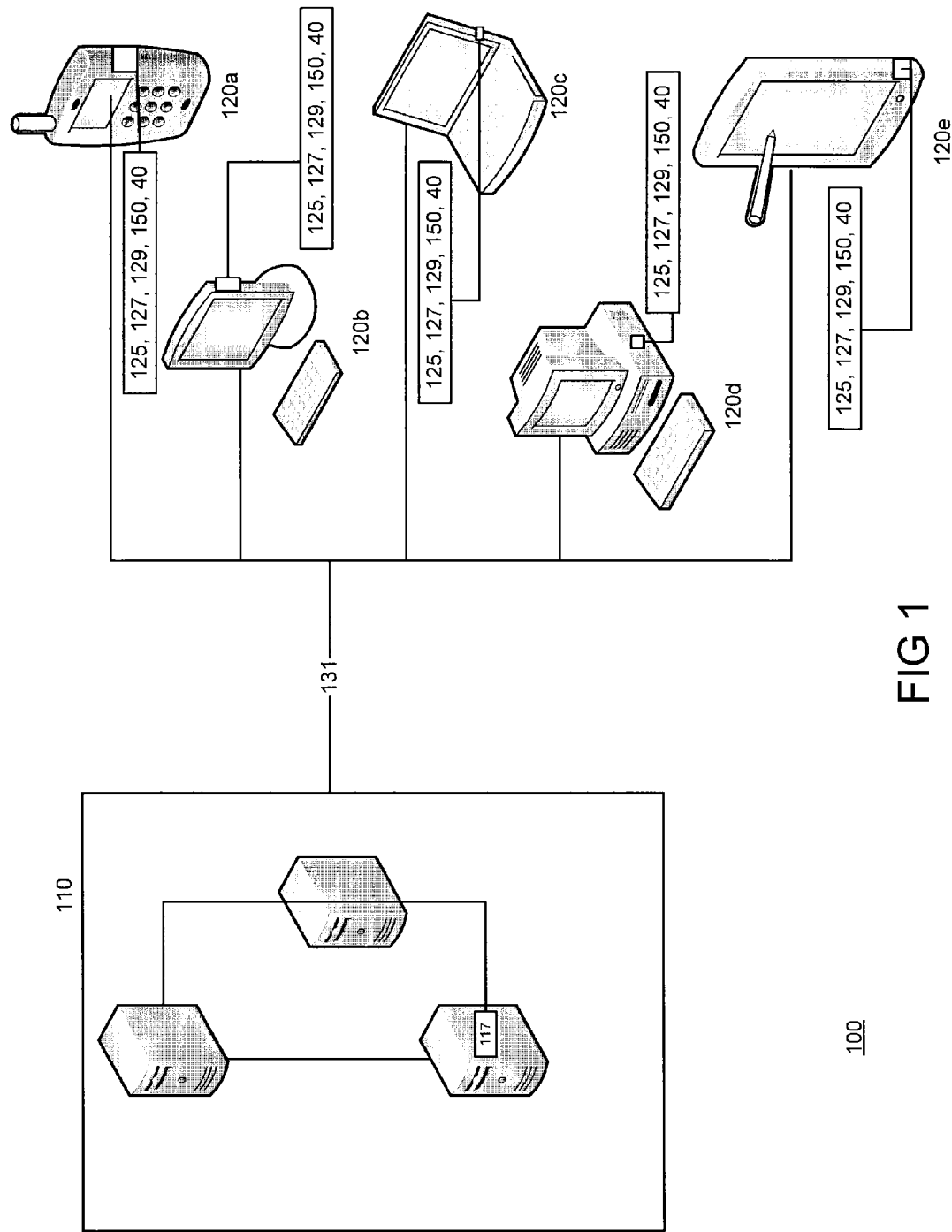
FIG. 1 depicts one example of a computing environment used to execute one or more aspects of an embodiment of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention.

FIG. 1 depicts one example of a computing environment 100 used to execute one or more aspects of an embodiment of the present invention. Computer program code executed by at least one processor divides a file into components that are stored on different resources of the computing environment 100 and assembled only in the random access memory (RAM) of a terminal 120a-120e in the computing environment 100 utilizing an assembly key. The file, which is broken up and then reassembled in RAM with the assembly key, can be any computer file, including but not limited to, an executable, a dynamic library file, and/or a data structure.

In this embodiment, a computer system 110, which can include a cloud and/or an enterprise system, is accessible by one or more terminals 120a-120e. The computer system includes at least one memory resource 115 upon which a file 117 is stored. In this embodiment, file 117 is one component of a disassembled file. The contents of the file 117 include but are not limited to a collection of unrelated bytes of data, which are referred to herein as a byte bucket 117 and/or a byte array. These terminals 120a-120e are connected to the computer system 110 via a network connection 131. This network connection 131 includes, but is not limited to, a wireless and/or a wired connection.

Each of the terminals 120a-120e includes at least one processor (not pictured) and at least one memory resource (not pictured). One or more processors on each terminal 120a-120e executes security computer readable program code 125. The terms "computer readable program code" and software are used interchangeably and both refer to logic executed by processing circuits on computer resources.

This security computer readable program code 125 installs a file 127 on the memory resource of each terminal 120a-120e. Like file 117, in an embodiment of the present invention, this file 127 is also a component of the aforementioned disassembled file. An embodiment of the file 127 is a collection of unrelated bytes of data, referred to herein as both a byte bucket and/or a byte array. The characterization of a file as a "byte bucket" and/or "byte array" is embodiments of the present invention is intended to characterize these entities, in their disassembled form, as not being meaningful, i.e., not containing complete data and/or a complete executable, and thus are nothing more than a bucket of bytes. The security computer readable program code 125 also installs an assembly key 129, which in an embodiment of the present invention, includes a random sequence of numbers.

The terminal 120a-120b and the additional resources within the computer system 110 each execute different software to enable a range of functionality to users connected to one or many of the resources. The computer logic, the code, that comprises the different software resides on memory resources (not pictured) internal and external to the terminals 120a-120e and/or the various resources of the computer system 110. This computer logic includes, but is not limited to, security computer readable program code 125, and computer readable program code 150. Security computer readable program code 125 and computer readable program code 150 are described separately for clarification but can be embodied in one or more entities. The terminals 120a-120e connect to the computer system 110 and utilize the different software (computer readable program code) implemented on the computer system 110.

Figure 2:
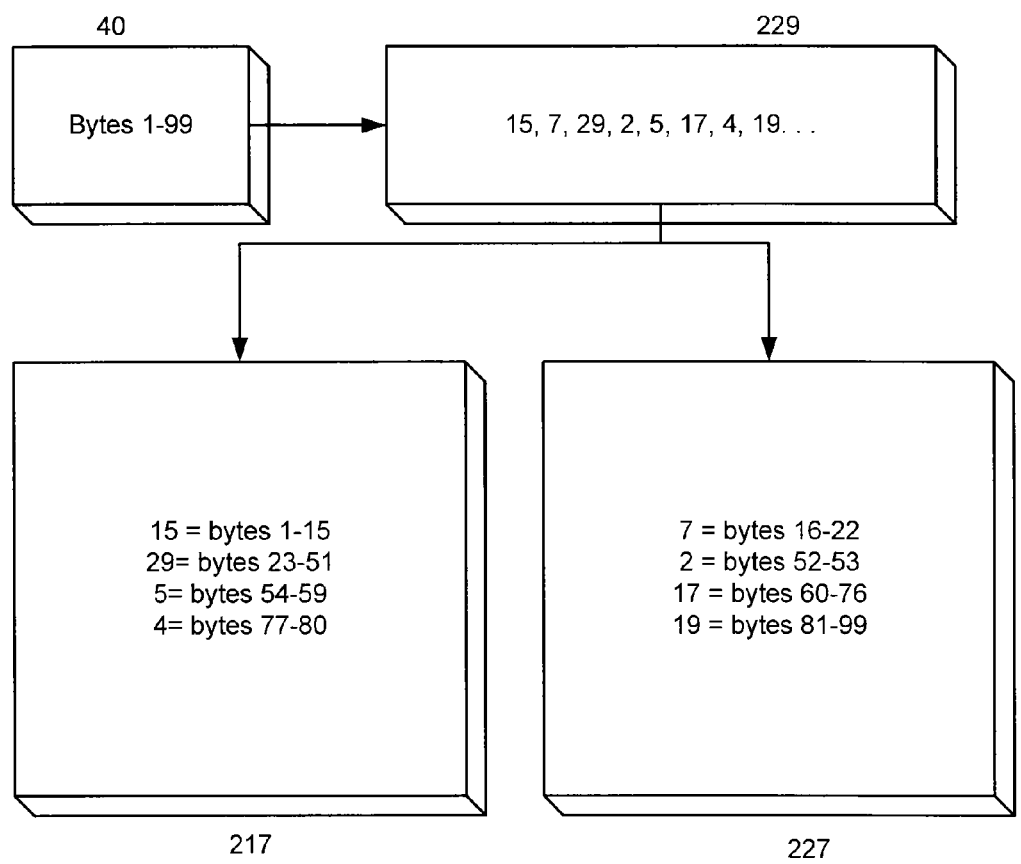
FIG. 2 depicts an aspect of an embodiment of the present invention.
Figure 3:
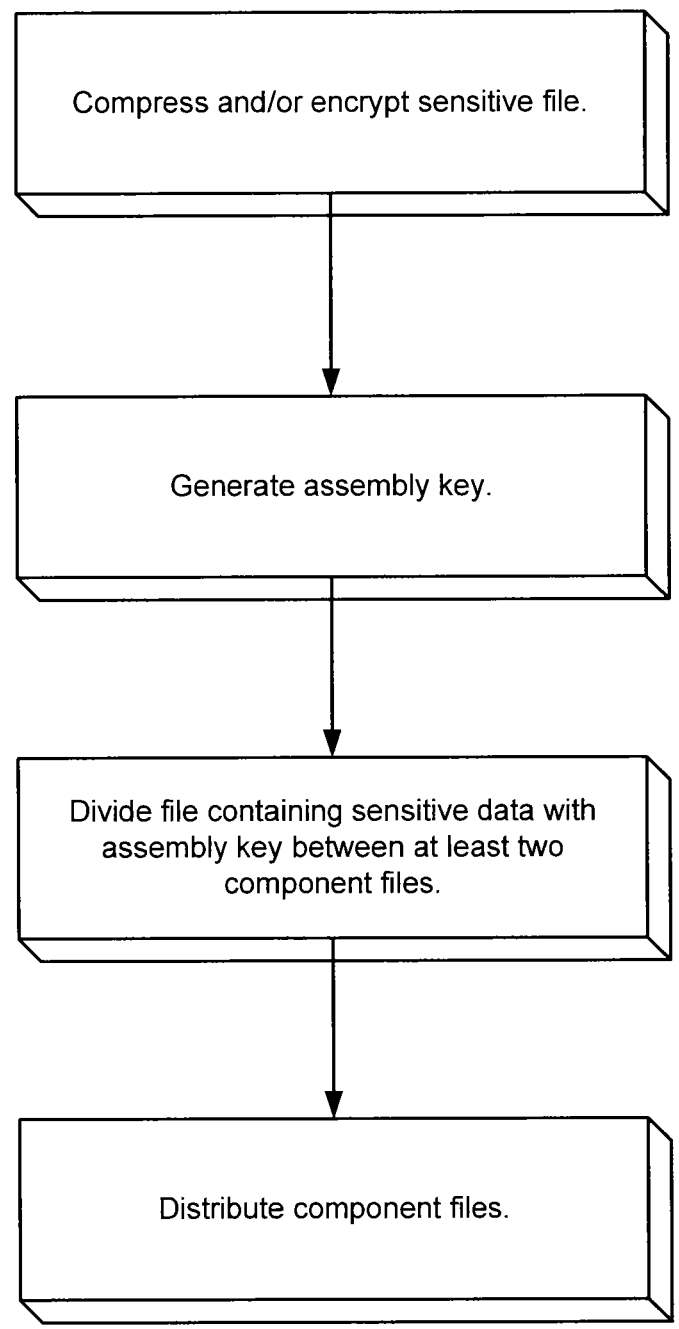
FIG. 3 depicts a workflow of one embodiment of a method for securing sensitive data in a technical environment, in accordance with one or more aspects of the present invention.

As explained further in FIG. 3, computer readable program code 150 on each terminal 120a-120e utilizes the assembly key 129 to assemble the at least one file 117 on the memory resource 115 in the computer system 110 and the file 127 on a memory resource in each of the terminals 120a-120e. The details of an embodiment of the assembly key 129 are discussed further in reference to FIG. 2.

In accordance with an embodiment of the present invention, in order to utilize the data in the file 127 in memory on each terminal 120a-120e, computer readable program code 150 executed by the processor on each respective terminal 120a-120e obtains the file 117 and/or a copy of the file, from the computer system 110 using a network connection 131. Once the computer readable program code 150 on a given terminal 120a-120e has obtained the file from the computer system 110, the computer readable program code 150 on the terminal 120a-120e uses the assembly key 129 to assemble a single file, the assembled file 40 from the file 117 that the computer readable program code 150 obtained from the computer system 110 and the file 127 that the security computer readable program code 125 installed on a memory resource (not pictured) of the terminal 120a-120e. In various embodiments of the present invention, the assembled file includes, but is not limited to, one or more of: an executable, a dynamic library file, and/or a data structure.

Once the computer readable program code 150 has assembled the files, the computer readable program code 150 loads the assembled file 40 into RAM, where it is utilized by the terminal 120a-120b. In an embodiment of the present invention, the computer readable program code 105 is a Java Native Interface layer interacting with a Java Virtual Machine running on the terminal 120a-120e. In a further embodiment of the present invention, a Java Native Interface layer obtains the file 117 from the computer system, assembles the files 117, 127, and loads the assembled file 40 into RAM on the terminals 120a-120e, only. One of skill in the art will recognize that In various embodiments of the present invention, the computer readable program code 150 can take many forms provided that it can assemble the component files with the assembly key and, in some embodiments, load the assembled file 40 into RAM. In this embodiment, different software processes perform the remainder of the described method.

In an embodiment of the present invention, once the assembled file 40 is loaded into RAM, it becomes accessible to the security computer readable program code 125. In an embodiment where the assembled file 40 comprises data, loading the assembled file 40 into RAM makes this data accessible to the security computer program 125 and/or other software running on the terminal 120a-120e. In an embodiment where the assembled file 40 comprises an executable, it can be utilized to run a dynamic library, accessible to the security computer readable program file 125 and/or other software on the terminal 120a-120e.

In an embodiment of the present invention, when the computer readable program code 125 loads the assembled file 40 into RAM, it deletes the file 127 from all resources in the terminal 120a-120e (other than RAM), including but not limited to, the non-RAM memory and the file system. In varied embodiments of the present method, the computer readable program code 125 deletes the file 127 from the non-RAM memory and/or file system of the terminal 120a-120e at the same time as it loads the assembled file 40 into RAM or after it loads the assembled file 40 into RAM. Thus, the in this embodiment, the assembled file 40, created by the program code 150 with the assembly key 129 from the file 117 on the computer system 110 and the file 127 on the terminal 120a-120e exists only in RAM and not on any other resource in the terminal 120a-120e or the computer system 110.

In an embodiment of the present invention, by storing the assembled file 40 only in RAM, the only way to obtain the assembled file 40 is to dump working RAM and then locate and appreciate this assembled file 40 amongst all other data in RAM, which is more difficult than simply pulling a file off a device.

By limiting the assembled file 40 to RAM, the file is secured and is not exposed to reuse, reverse engineering, and other security attacks or threats. In embodiments of the present invention where the assembled file 40 is an executable, executing the assembled file locally on the terminal 120a-120e, as opposed to accessing the assembled file 40 on the computer system 120 over a network connection 131, saves time and computing resources and positively impacts the performance of the terminal 120a-120e, from the user perspective.

As described in further detail in reference to FIG. 3, in a further aspect of the invention, software (not pictured), executed on one or more computing resources, such as a processors, splits an original file into the file 117 on the computer system 110 and the file 127 on the terminal 120-120e. A software process also generates the assembly key 129, which a software (program code) utilizes to split this original file into the file 117 on the computer system 110 and the file 127 that the security program code 125 installs on one or more of its local memory resources on a terminal 120*a*-120*e*.

Apportioning an original file is discussed further in reference to FIG. 3. In an embodiment of the invention, before program code executed on a processor splits an original file, that program code or different program code encrypts and/or compresses the file utilizing an encryption algorithm and/or method and/or a compression algorithm known to one of skill in the art. Thus, once program code 150 obtains the file 117 from the computer system 110 and generates an assembled file 40, the program code 150 decrypts and/or decompresses the assembled file 40 in addition to loading the assembled file 40 into the terminal's 120*a*-120*e* RAM.

In accordance with an embodiment of the present invention, the security computer readable program code 125 is an application program interface. In an embodiment of the present invention, a user purchases the terminal 120*a*-120*e* with this security computer readable program code 125 pre-loaded. Alternatively the user could utilize software on the terminal 120*a*-120*e* to download the software from a remote resource, such as the computer system 110, in one example, via the network connection 131. Because the security computer readable program code 125 installs the assembly key 129 and a file 127 on the terminal 120*a*-120*e*, the software on terminal 120*a*-120*e* would only download the security computer readable program code 125 from a remote resource once. To utilize the assembled file 40, program code 150 on a terminal 120*a*-120*e* with the assembly key 129 and the file 127, installed by the security computer readable program code 125, would access a remote resource, such as the computer system 120, via the network connection 131, to obtain the file 117 only, not the security computer readable program code 125, repeatedly. Accessing the security computer readable program code 125 repeatedly would be less efficient and could impact the functionality of the terminal 120*a*-120*e*.

One of skill in the art will recognize that the description of an embodiment of the present method utilizing the two files 117, 127, in FIG. 1 is meant as an example. Utilizing the system and method of the invention, one of skill in the art will recognize that an assembled file 40 (or files) can be secured by assembling any number of component files with one or more assembly keys 129.

Figure 4:
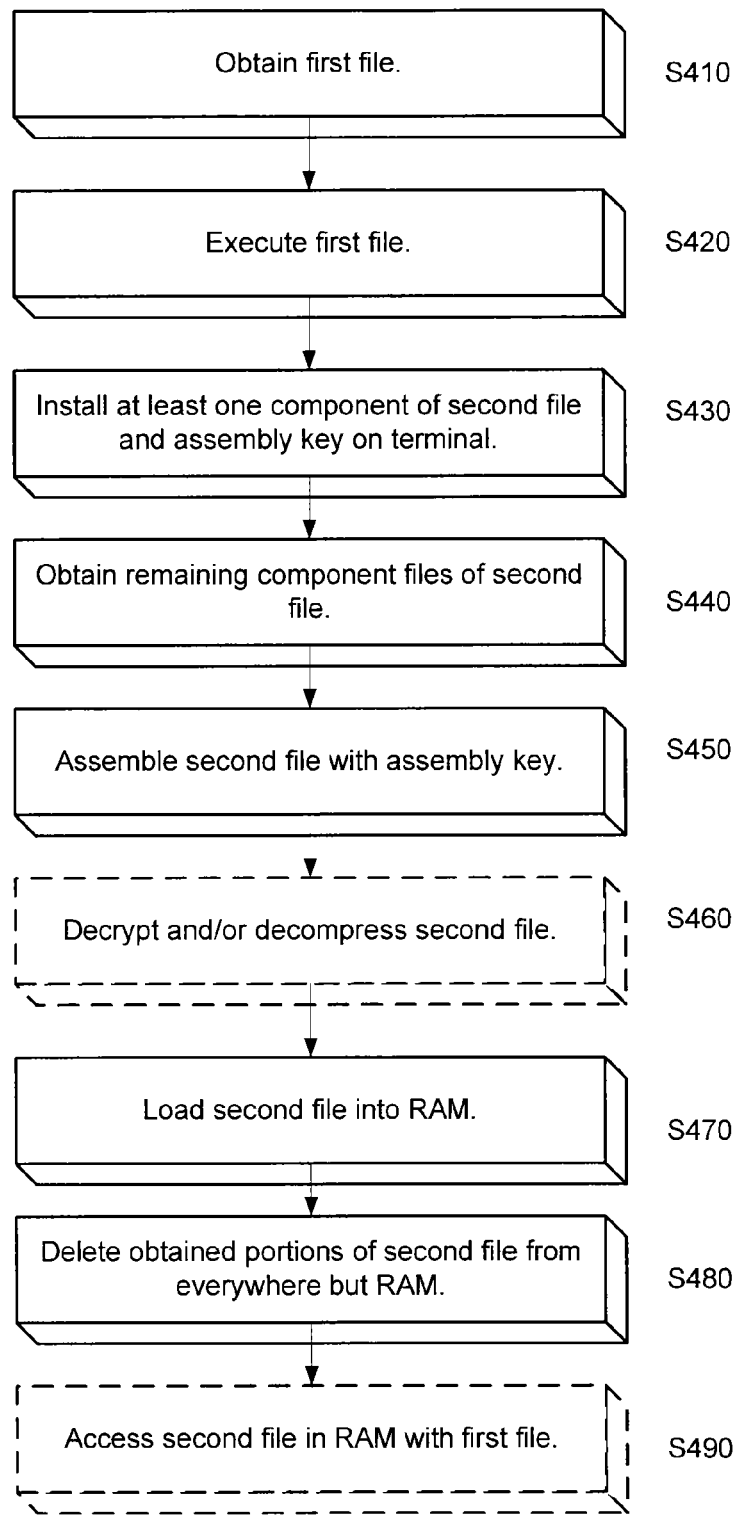
FIG. 4 depicts a workflow of one embodiment of a method for securing sensitive data in a technical environment, in accordance with one or more aspects of the present invention.

The computing environment 100 of FIG. 1 is one of many computing environments that can be utilized to perform the workflows of embodiments of the present invention in FIGS. 3-4.

Before describing the workflows of FIGS. 3-4, aspects of the assembly key 129 are discussed in reference to FIG. 2. FIG. 2 contains is an example of an assembly key 229 and describes how this assembly key 229 represents the division of the assembled file 40 into a first file 217 and a second file 227, in an embodiment of the present invention. In this embodiment, the assembly key 229 includes a sequence of random numbers. In this embodiment, each number in the assembly key 129 represents a group of consecutive bytes of the assembled file 40 distributed to two or more counterpart files, such as first file 217 and second file 227. Each number on the sequence represents a group of bytes from the original file (the assembled file 40. The assembled file 40 is initially split into counterpart files as a method of securing its content.

In the embodiment of FIG. 2, the original file, which when re-assembled in the assembled file 40, is split into a first file 217, such as the file 117 on the computer system 110 in FIG. 1, and a second file 227, such as the file 127 installed on a terminal 120*a*-120*e* in FIG. 1. The use of two files in FIG. 2 is merely in an example and one of skill in the art will recognize that dividing the assembled file 40 into more than two files is contemplated by the present invention.

Referring to FIG. 2, an exemplary sequence of the assembly key begins 15, 7, 29, 2, 5, 17, 4, 19. In this embodiment, a processor executing computer code distributed the content of the assembled file 40 between a first file 217 and a second file 227. In accordance with the sequence in the assembly key 229, a processor places the first 15 bytes of the assembled file 40 in the first file 217, which is, in one example, a byte array. The processor then places the next 7 bytes of the assembled file 40 in the second file 227, which is, in one example, a byte array. Thus, the first file 217, which is a first portion of the assembled file 40 includes a first group of consecutive bytes in the assembled file 40, and the second file 227, which is a second portion of the assembled file 40, includes a second group of consecutive bytes in the assembled file 40, and the second group of bytes follows the first group of bytes sequentially in the assembled file 40. Then, according to the assembly key, the processor places the next 29 bytes of the assembled file 40 into the first file 217 and the next 2 bytes of the assembled file 40 into the second file, and so on, until the bytes of the assembled file 40 are distributed into the first file 217 and the second file 227. The random distribution of bytes into more than one file guards against reverse engineering so that a user can be in possession of either the first file 217 or the second file 227 without being able to reverse engineer and create an assembled file 40.

The sequence of bytes in FIG. 2 is an example of an assembly key 229 in an embodiment of the present invention. Varied sequences of numbers are used as assembly keys 229 across different embodiments. One of skill in the art will also appreciate that designating bytes in the assembled file 40 by every-other number in an assembly key 40 is also intended as an example of an embodiment. One of skill in the art may chose to configure a resource to vary the distribution, for example, by using a number in the sequence that is not the first number to select the first group of bytes to place in a file.

Referring to FIG. 1-2 and subsequent Figures, the flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIGS. 3 and 4 depict workflows of two aspects of embodiments of a method for securing sensitive data in a technical environment, in accordance with one or more aspects of the invention. For ease of understanding, the actions of the program code executed by one or more processors, such as security program code 125 and computer readable program code 150 are portrayed as a single-threaded process. However, one of skill in the art will recognize that further embodiments of the present invention utilize both single and multi-threaded processes as well as one to many processors with singular and multiple cores.

In an embodiment of the present invention, the assembled file 40, before it is run in RAM, for security purposes is divided into at least two files. FIG. 3 depicts a workflow 300 of an embodiment of the present invention where computer readable program code generates an assembly key and creates the component files that can be combined using this assembly key, into a complete file, such as the assembled file 40. After the computer readable program code splits to assembled file 40, which contains potentially sensitive data, into at least two component files, neither of which can be used to derive the original file, the assembled file 40, less than all of the component files can be stored in less secure locations, such as a shared resource, like a cloud, without the security concerns regarding the assembled file 40.

Returning to FIG. 3, computer readable program code executed by one or more processors on a computing resource compresses and/or encrypts a file containing sensitive data (S310).

The computer readable program code generates an assembly key (S320), which in one embodiment of the present invention, contains a random sequence of numbers.

The computer readable program code divides the file containing sensitive data into at least two component files, i.e., files that each contain a portion of data from the file containing sensitive data (S330). The assembly key dictates the distribution of the bytes of data in the sensitive file between the at least two component files. In an embodiment of the present invention where the assembly key is a sequence of random numbers, like the assembly key 229 in FIG. 2, each number on the sequence represents a group of bytes in the original file that should ne places in one of the component files, but not the other component files. The next number in the sequence in the assembly key represents the next group of bytes, including but not limited to the next group of consecutive bytes, to be placed in a different component file than the first group of bytes.

In an embodiment of the present invention, the assembly key random number sequence begins "9, 15, 6, 3" and computer readable program code creates two component files. In this example, computer readable program code puts the first 9 bytes of the original file into a first component file. The computer readable program code puts the next 15 bytes of the original file into the second component file. The computer readable program code puts the next consecutive 6 bytes of the original file into the first component file and the computer readable program code puts the nest 3 consecutive bytes in the original file, after the 6 bytes that it placed into the first file, into the second component file. The computer readable program code executed on one or more processors continues distributing the bytes in the original file into the component files until the computer readable program code has placed each byte in the original file into a component file. When the bytes of the original file are partitioned in this manner, the resultant files each contain bytes that have no comprehensive logical meaning when each file is taken individually. Thus, these resultant files can be referred to as both byte buckets and byte arrays. However, once reunited by using an assembly key, the resultant file has logical meaning.

Unlike the original file, the component files do not contain sensitive data because the random assortment of bytes in each component file cannot be used to reverse engineer the original file. Only a user in possession of all the component files and the assembly key would be able to reconstruct the original file. Thus, computer readable program code distributes component files to disparate locations (S340). In an embodiment of the present invention, computer readable program code creates an API (S350) and embeds one or more components files, but not all the component files, and the assembly key into the API. When a user install the API on a terminal, the component and the assembly key are installed on the terminal and the terminal can access the location of the remaining component(s) via a network connection.

FIG. 4 is a workflow of an embodiment of the present method where an original secure file is reassembled from its components in a secure manner so that users and outside resources cannot access the assembled file for the purposes of copying the file.

In the embodiment FIG. 4, computer readable program code executed by a processor on a terminal obtains a first program file, for example, the API referenced in FIG. 3 (S410). The computer program executes the obtained program, such as an API (S420) and when executed, the API or other program installs at least one component of an original file and an assembly key for use in assembly of the original file, on a memory resource of the terminal (S430). In an embodiment of the present invention, the installed component(s) of the original file and all subsequently referenced component files on the original file contain bytes with no logical meaning when taken together and can be characterized as byte arrays and/or byte buckets.

Computer readable program code executed by a processor on the terminal obtains the remaining component files, i.e., one or more files that contain the remaining bytes of an original file from a remote computing resource, including but not limited to a cloud (S440).

After obtaining files with the remaining bytes, the computer program assembles the original file, which in an embodiment of the present invention, is a file containing code that can be executed by a processor (S450). The computer program assembles the file from its components by using the assembly key. If the assembled file is encrypted and/or compressed, the computer readable program code decrypts and/or decompresses the file (S460). Once reassembled and decompressed, the computer readable program code loads the file into RAM on the terminal (S470) and deletes the component file(s) previously obtained from the remote resource (S480). In an embodiment of the present invention, the computer readable program code loads the assembled file into RAM (S470) and deletes the component file(s) from the remote resource (S480) simultaneously. In another embodiment of the present invention, the computer readable program code loads the assembled file into RAM (S470) and deletes the component file(s) from the remote resource (S480) concurrently. In an embodiment of the present invention, once the assembled file is loaded into RAM, the API or other program accesses the assembled file (S490).

In an embodiment of the present invention, the assembled file, the result of the workflow of FIG. 4, is an executable program that performs a proprietary decoding method when executed in RAM. In another embodiment of the present invention, the assembled file is a file from a data library containing proprietary functionality.

In an embodiment of the present invention, the component files that are reassembled into the original file are not the same in size. In an embodiment of the technique, the file that the program places on a remote resource is smaller than the file that is installed on the terminal 120a-120e, cutting down on transmission time and resources when obtaining the file from the remote resource, such as a cloud. In one embodiment, at most 20% of the bytes of the original file are stored in a cloud.

In another embodiment of the present invention, when creating the individual component files, a computer program distributes bytes from the original file that identify the format of the file, e.g., executable, library file, etc., into a file that will not be installed on a memory resource of the terminal 120a-120e. This identifying information, which would appear in a file header, is either placed in a file portion on a remote system, or excluded entirely from the component files. In this example, the computer program that reassembles the file would be configured to add the absent header information.

In another embodiment of the present invention, the bytes is the file do not coordinate with the assemble key, but instead, are shifted over one or more values. Thus, should a user capture the assemble key and the component files, this user would be unable to assemble the sensitive file data without discovering the shift.

In another embodiment of the present invention, the portions of the files are encoded with version numbers. Thus, multiple versions of the same portion of a file that are useful in different versions of the assembled file (software) can be made remotely accessible to a terminal 120a-120e and the software on the terminal 120a-120e will be able to select the correct version of the file to assemble the secure file to load into RAM.

Figure 5:
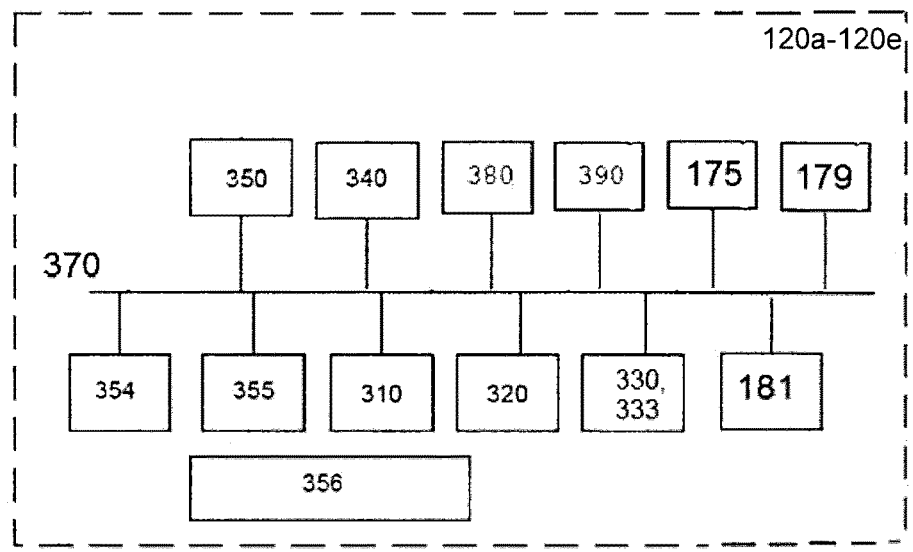
FIG. 5 depicts a terminal utilized to practice one or more aspects of an embodiment of the present invention.

A component-level diagram of an embodiment of a terminal 120a-120e, in FIG. 1, is described with references to FIG. 5. Referring to FIG. 5, the terminal 120a-120e can comprise at least one microprocessor 310 and a memory 320, both coupled to the system bus 370. The microprocessor 310 can be provided by a general purpose microprocessor or by a specialized microprocessor (e.g., an ASIC). In one embodiment, terminal 120a-120e can comprise a single microprocessor which can be referred to as a central processing unit (CPU). In another embodiment, terminal 120a-120e can comprise two or more microprocessors, for example, a CPU providing some or most of the terminal 120a-120e functionality and a specialized microprocessor performing some specific functionality. A skilled artisan would appreciate the fact that other schemes of processing tasks distribution among two or more microprocessors are within the scope of this disclosure.

Terminal 120a-120e can further comprise a communication interface 340 communicatively coupled to the system bus 370. In one embodiment, the communication interface can be provided by a wired or wireless communication interface. The wired or wireless communication interface can be configured to support, for example, but not limited to, the following protocols: at least one protocol of the IEEE 802.3, 802.11/802.15/802.16 protocol family, at least one protocol of the HSPA/GSM/GPRS/EDGE protocol family, TDMA protocol, UMTS protocol, LTE protocol, and/or at least one protocol of the CDMA/1xEV-DO protocol family.

Terminal 120a-120e can further comprise a battery 356. In one embodiment, the battery 356 can be provided by a replaceable rechargeable battery pack. The terminal 120a-120e can further comprise a GPS receiver 380. The terminal 120a-120e can further comprise at least one connector 390 configured to receive a subscriber identity module (SIM) card.

The terminal 120a-120e can further comprise an imaging device 330, provided, for example, by a two-dimensional imager.

The terminal 120a-120e 210 can further comprise one or more devices 330, 333 configured to decode a signal of decodable indicia, such as a bar code and/or an RFID tag. In one embodiment, a bar code scanner 333, such as an optical scanning device, can be configured to scan a bar code containing an encoded message and to output raw message data containing the encoded message. In another embodiment, the RFID reading device 330 can be configured to read a memory of an RFID tag containing an encoded message and to output decoded message data corresponding to the encoded message. In a further embodiment, the RFID transmit power level of RFID reading device 330 is controlled by terminal 120a-120e. As used herein, "message" is intended to denote a bit sequence or a character string comprising alphanumeric and/or non-alphanumeric characters. An encoded message can be used to convey information, such as identification of the source and the model of an item, for example, in an EPC code.

Although devices 330, 333 are depicted in FIG. 3 in a single entity, one of skill in the art will recognize that in further embodiments of an terminal 120a-120e of the present invention could include devices that are not grouped together to handle imaging and reading RFID tags. The terminal 120a-120e 1 210 of FIG. 3 is offered merely as an sample architecture.

In one embodiment, the terminal 120a-120e 210 can further comprise a graphical user interface including a display adapter 175 and a keyboard 179. In one embodiment, the terminal 120a-120e can further comprise an audio output device, e.g., a speaker 181.

The keyboard 179 can be a full QWERTY keyboard and/or limited inputs that start and stop various activities, including, but not limited to scanning a bar code, scanning an RFID tag, initiating and stopping the collection of data from an accelerometer package, downloading files from a remotely located computer resource. The keyboard 179 may be implemented as a touchscreen, discrete keys, or other methods, which in no way limit the scope of the invention.

Terminals 120a-120e include, but are not limited to cellular telephones, smart phones, PDAs, and/or other portable computing devices.

Figure 6:
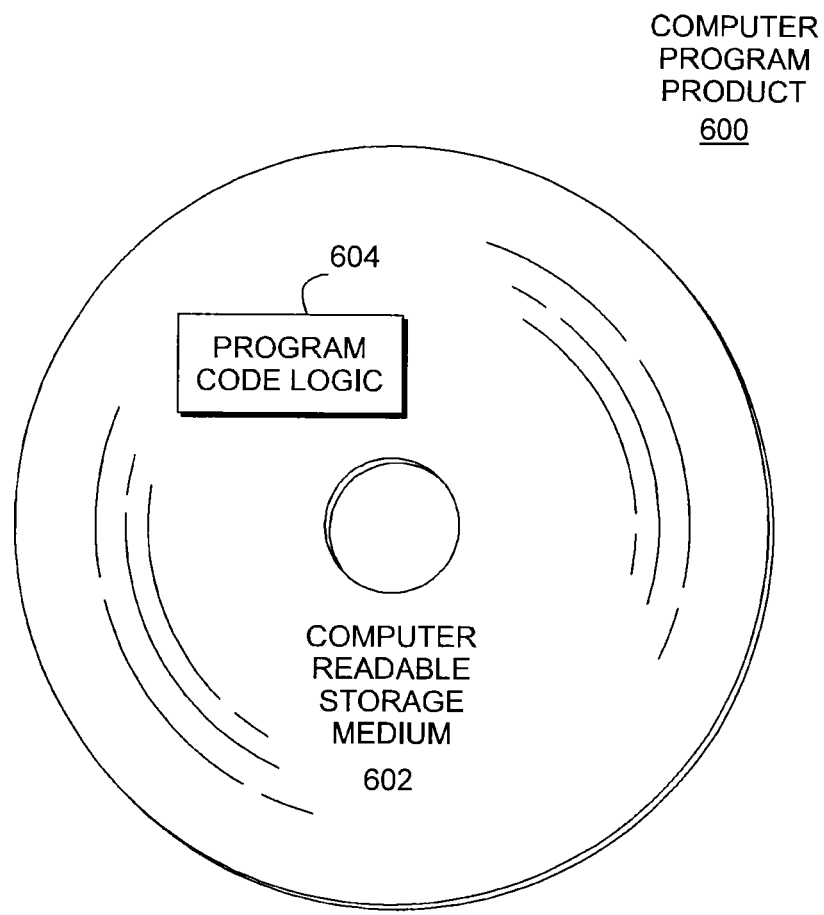
FIG. 6 depicts a computer program product utilized to practice one or more aspects of an embodiment of the present invention.

Computer-readable code or instructions need not reside on the enumerated computer systems: for example, in FIG. 1, terminals 120a-120 and computer system 110. Referring to FIG. 6, in one example, a computer program product 600 includes, for instance, one or more non-transitory computer readable storage media 602 to store computer readable program code means or logic 604 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer readable program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on one resource of a computer system 110, such as a cloud, partly on various resources, and/or partly on the terminals 120a-120e and partly on one or more resources of the computer system 110.

One or more aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

As explained throughout and specifically in reference to FIGS. 1 and 4, one or more components of an original file can be stored on a memory resource of a cloud and accessed by a terminal 120a-120e from this cloud. However, it is understood in advance that although this disclosure includes this detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
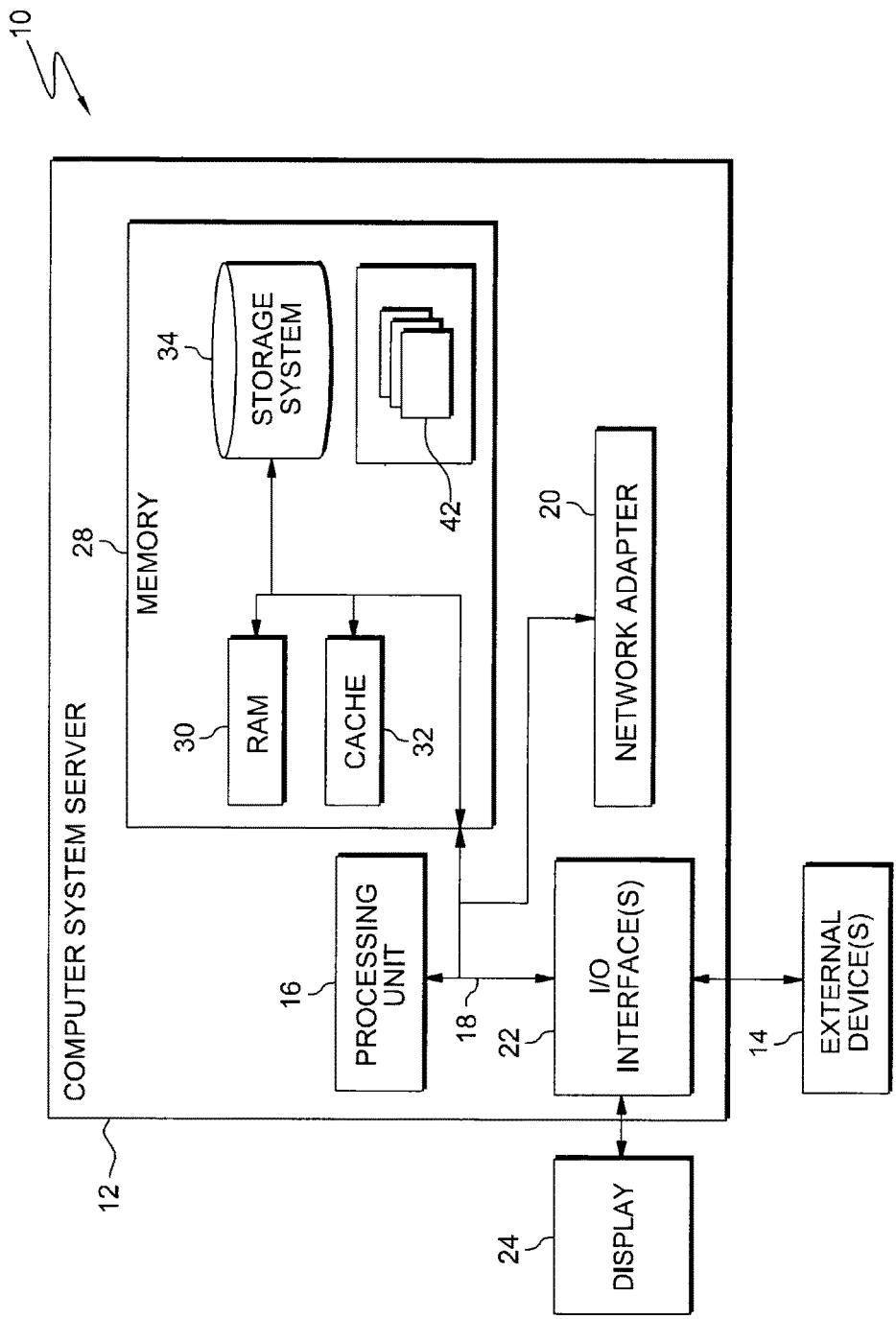
FIG. 7 depicts a cloud computing environment according to an embodiment of the present invention.

Referring now to FIG. 7, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Software, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for securing sensitive data in a technical environment, the method comprising:
    obtaining, by a processor, a first file,
    executing, by the processor, the first file, wherein upon execution by the processor the first file installs in a memory a first portion of a second file and an assembly key to assemble the second file;
    obtaining, by the processor, a second portion of the second file; and
    assembling, by the processor, with the assembly key, an assembled second file, wherein the assembled second file comprises the first portion of the second file and the second portion of the second file.

2. The method of claim 1, wherein the assembled second file is an encrypted and compressed file.

3. The method of claim 2, further comprising: responsive to assembling the second file, decrypting and decompressing the second file.

4. The method of claim 1, wherein the assembly key comprises a randomly generated number sequence.

5. The method of claim 1, wherein the first file is an application program file that executes the assembled second file and wherein the first portion of the assembled second file comprises bytes with no logical meaning and the second portion of the assembled second file comprises bytes with no logical meaning and wherein the assembled second file has logical meaning, the assembled second file created by assembling the first portion of the second file and the second portion of the second file with the assembly key.

6. The method of claim 1, wherein the assembly key comprises a randomly generated number sequence and wherein each number in the assembly key represents a group of consecutive bytes of the second file distributed in one of the first portion of the second file or the second portion of the second file.

7. The method of claim 1, further comprising using the assembly key to direct placement of said portions into more than one file.

8. The method of claim 1, further comprising designating bytes in the assembled second file for distribution with variable sequences of numbers in the assembly key.

9. The method of claim 8, wherein a first group of alternating numbers of the assembly key beginning with the first number of the assembly key represent bytes of the second file in the first portion of the second file and a second group of alternating numbers beginning with the second number of the assembly key represent bytes in the second portion of the second file.

10. The method of claim 1, wherein the assembled second file is at least one of: a dynamic library, a data structure, an executable file.

11. The method of claim 1, further comprising: loading the assembled second file into a random access memory and deleting the second portion of the second file from a file system in the technical environment.

12. The method of claim 11, further comprising: performing the loading and the deleting concurrently.

13. The method of claim 1, further comprising: loading the assembled second file into a random access memory and utilizing the first file to access the second file in the RAM.

14. A computer program product for securing data in a technical environment, the computer program product comprising a non-transitory computer readable storage medium and program code stored on the computer readable storage medium, the program code executable by a processing circuit to perform a method comprising:

obtaining, by a processor, a first file that is executable;

executing, by the processor, the first file, wherein upon execution by the processor the first file installs in a memory a first portion of a second file and an assembly key to assemble other portions of the second file;

obtaining, by the processor, a second portion of the second file; and assembling, by the processor, with the assembly key, an assembled second file, wherein the assembled second file comprises the first portion of the second file and the second portion of the second file.

15. The computer program product of claim 14, further comprising program code that loads the assembled second file into a random access memory.

16. The computer program product of claim 14, wherein the assembled second file is an encrypted and compressed file, the computer program product further comprising code that, responsive to assembling the second file, decrypts and decompresses the assembled second file.

17. The computer program product of claim 14, configured to retrieve the first file that comprises an application program accessing the assembled second file in random access memory.

18. The computer program product of claim 14, wherein the assembled second file is at least one of: a dynamic library, a data structure, an executable file.

19. A computer system for securing data in a technical environment, the computer system comprising:

a plurality of computing nodes connected by a network;

at least one of said nodes comprising a non-transitory computer readable storage medium and a processor that executes program code stored thereon;

an assemblable file divided into component portions that are stored across the system on said plurality of nodes;

wherein said program code on said at least one node obtains, by the processor, both an assembly key and a first component portion of the assemblable file from at least one one of said plurality of computing nodes, the program code executed by the processor to perform the method of:

obtaining, by the processor, a second component portion of the assemblable file; and assembling, by the processor, with the assembly key, the assemblable file, wherein the assemblable file comprises the first component portion of the assemblable file and the second component portion of the assemblable file.

20. The computer system of claim 19, wherein dividing the component portions of the assemblable file further comprises using the assembly key to direct placement of said component portions into more than one node in the system.

* * * * *